United States Patent

Matsubara

[11] 3,830,559
[45] Aug. 20, 1974

[54] SUPER-WIDE-ANGLE LENS SYSTEMS FOR PHOTOGRAPHIC CAMERAS

[75] Inventor: Masaki Matsubara, Tokyo, Japan

[73] Assignee: Olympus Optical Company Limited, Tokyo, Japan

[22] Filed: Mar. 14, 1973

[21] Appl. No.: 341,175

[30] Foreign Application Priority Data
Mar. 29, 1972  Japan.............................. 47-31302

[52] U.S. Cl. ................................................. 350/214
[51] Int. Cl. ............................................. G02b 9/64
[58] Field of Search ..................................... 350/214

[56] References Cited
UNITED STATES PATENTS
3,512,874  5/1970  Woltche............................. 350/214
3,549,241  12/1970  Mori ............................. 340/214 X
3,635,546  1/1972  Mori ................................. 350/214

Primary Examiner—John K. Corbin
Attorney, Agent, or Firm—Waters, Roditi, Schwartz & Nissen

[57] ABSTRACT

A super-wide-angle lens system for photographic cameras, which comprises six components and ten lens elements and in which the first component is a positive meniscus lens element, the second component consists of two and three negative meniscus lens elements, the third component is a positive doublet lens element, the fourth component is a negative doublet lens element, the fifth component is a positive meniscus lens element and the sixth component is a positive lens element, and which fulfills the following four conditions, i.e.

1. $0.45f < |\Sigma f_i| < 0.75f$
   $f_i < 0$
2. $0.3f < d_9 + d_{10} < 0.8f$
3. $0.33f < |R_{13}| < 0.85f$
   $R_{13} < 0$
4. $0.22f < d_{12} + d_{13} < 0.7f$ wherein $f$ represents the overall focal length of the system, $\Sigma f_i$ represents the sum of focal lengths of the lens elements constituting the second component of $i = 2, 3$ and $i = 2,3,4$ numbering from the object side, $d_9$, $d_{10}$, $d_{12}$, and $d_{13}$ represent the axial thicknesses of the fixth, sixth, seventh and eighth lens elements constituting the third and fourth components, respectively, and $R_{13}$ represents the radius of curvature of the cemented surface of the fourth component.

11 Claims, 24 Drawing Figures

FIG_1

FIG_2

FIG_3a     FIG_3b     FIG_3c

FIG_3d

FIG_3g  β=1/40

FIG_3h  β=1/40

$d_{11}=6.65$
$d_{16}=3.97$

—— Sagittal
--- Meridional

FIG_4a

— Spherical Aberration
--- Sine Condition

FIG_4b

— Sagittal
--- Meridional

FIG_4c

FIG_4d

FIG_5a

FIG_5b

FIG_5c

FIG_5d

FIG_5e

FIG_6d

FIG_6e

SUPER-WIDE-ANGLE LENS SYSTEMS FOR PHOTOGRAPHIC CAMERAS

This invention relates to super-wide-angle lens systems for photographic cameras and more particularly to a retrofocus type super-wide-angle lens system for use in 35 mm single-lens reflex cameras and having such optical properties as an aperture ratio on the order of F/2.0 and a large picture angle up to 84°.

In general, retrofocus type wide-angle lens systems are designed to operate with a given back-focal length. Thus, the wider the picture angle the greater must the refractive power of a front lens group be made. As a result, aberrations produced at the front lens group became large and more particularly the spherical aberration and the coma of the system having a large aperture ratio become considerably large thereby rendering the correction of these aberrations difficult. In addition, the above mentioned super-wide-angle lens system having a large aperture ratio on the order of F/2.0 and a large picture angle up to 84° becomes longer in its overall length and becomes larger in the diameter of its front lens, and as a result, its handling becomes troublesome and hence provision must be made of a specially large filter for the front lens, which is extremely unfavorable.

The object of the invention is to provide a super-wide-angle lens system for photographic cameras, which can overcome the above mentioned disadvantage on the aberrations which have been encountered with conventional wide-angle lens systems, which has such optical properties as an aperture ratio on the order of F/2.0 and a large picture angle up to 84°, which may use a conventional filter whose diameter is on the order of 55 mm, and which is small in size and extremely easy in handling while retaining the high degree of correction in various aberrations over the entire system aperture ratio and over the entire picture angle.

In accordance with the invention, the foregoing object can be attained by the provision of a super-wide-angle lens system which comprises six components and 10 lens elements and in which the first component is a positive meniscus lens element, the second component consists of two and three negative meniscus lens elements, the third component is a positive doublet lens element, the fourth component is a negative doublet lens element, the fifth component is a positive meniscus lens element and the sixth component is a positive lens element, and which fulfills the following four conditions, i.e.

1. $0.45f < |\Sigma f_i| < 0.75f$
   $f_i < 0$
2. $0.35f < d_9 + d_{10} < 0.8f$
3. $0.33f < |R_{13}| < 0.85f$
   $R_{13} < 0$
4. $0.22f < d_{12} + d_{13} < 0.7f$ wherein $f$ represents the overall focal length of the system, $\Sigma f_i$ represents the sum of focal lengths of the lens elements constituting the second component and $i = 2$, 3 and $= 2, 3, 4$ numbering from the object side, $d_9$, $d_{10}$, $d_{12}$ and $d_{13}$ represent the axial thicknesses of the fifth, sixth, seventh and eighth lens elements constituting the third and fourth components, respectively, and $R_{13}$ represents the radius of curvature of the cemented surface of the fourth component.

Further objects, features, and advantages of the invention will be apparent by reference to the following specification and the accompanying drawings, wherein.

Figure 1:
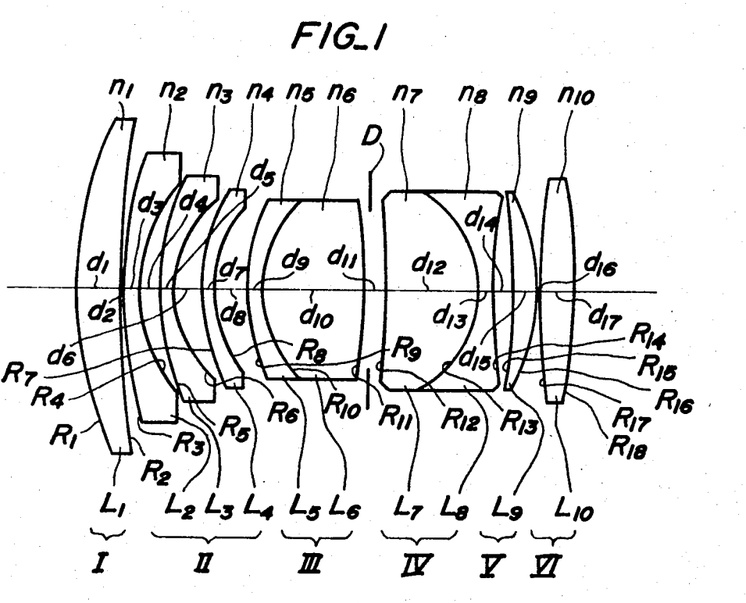
FIG. 1 is a diagrammatic view of a preferred form of the invention.

With reference to FIG. 1 of the drawing, the preferred lens system comprises six components I to VI and ten lens elements $L_1$ to $L_{10}$. The first component I is a positive meniscus lens element $L_1$ which serves to correct the distortion and the coma of the system. In addition, the positive meniscus lens element $L_1$ is made of glass material having a suitable Abbe number ($\nu$ value) so as to correct the magnification chromatic aberration. The second component II consists of three negative meniscus lens elements $L_2$, $L_3$ and $L_4$. The sum of the negative refractive powers of these negative meniscus lens elements $L_2$, $L_3$ and $L_4$ is made so great that the back focus of the system is of a given length. The air space between adjacent lens elements of the second component II is made as short as possible so as to prevent the diameter of the front lens element $L_1$ from being enlarged owing to the desired large aperture ratio of the system while retaining the high degree of correction in curvature of a wide image surface. The above mentioned first and second components I and II constitute a front lens group. In order to make the aperture ratio of the system large, the front lens group I, II produces considerably large spherical aberration and aberrations out of axis which could not sufficiently be corrected. In accordance with the invention, these aberrations are corrected by a rear lens group consisting of the third component III and succeeding rear components IV V and VI.

The third component III consists of the fifth and sixth lens elements $L_5$ and $L_6$ cemented together to form a positive doublet lens whose axial thickness $d_9 + d_{10}$ is large. A diaphragm D is provided between the third and fourth components III and IV. The fourth component IV consists of the seventh and eighth lens elements $L_7$ and $L_8$ cemented together to form a negative doublet lens whose axial thickness $d_{12} + d_{13}$ is also large. These third and fourth components III and IV serve to correct the aberrations out of axis and make the back focus of the system long. The cemented surface $R_{13}$ of the fourth component IV is made positively and strongly refractive so as to correct the sagittal coma and the spherical aberration which have been increased due to the large aperture ratio. The fifth component V is a positive meniscus lens element $L_9$ and the sixth component VI is a biconvex lens element $L_{10}$.

These fifth and sixth components V and VI serve to correct the spherical aberration produced owing to the large aperture ratio of the system. In addition, these fifth and sixth components V and VI are made of glass material having a suitable Abbe number so as to correct the chromatic aberration.

For optimum performance, the sum of focal lengths $\Sigma f_i$ of the lens elements constituting the second component II where $i$ 32 2, 3 and $i = 2, 3, 4$ numbering from the object side, the sum of axial thicknesses $d_9+d_{10}$ of the lens elements $L_5$ and $L_6$, the radius of curvature $R_{13}$ of the cemented surface of the fourth component IV, and the sum of the axial thicknesses $d_{12}+d_{13}$ of the lens elements $L_7$ and $L_8$ should fulfill the following four conditions, i.e.

1. $0.45f < |\Sigma f_i| < 0.75f$
   $f_i < 0$
2. $0.3f < d_9+d_{10} < 0.8f$
3. $0.33f < |R_{13}| < 0.85f$
   $R_{13} < 0$
4. $0.22f < d_{12}+d_{13} < 0.7f$ where $f$ is the overall focal length of the system.

The reasons why the above mentioned four conditions 1 to 4 should be fulfilled for optimum performance are as follows.

The condition 1 prevents the diameter of the front lens element $L_1$ from becoming enlarged and limits the spherical aberration and the coma out of axis produced due to the large aperture ratio to the least possible value and also insures a long back-focal length. If $|\Sigma f_i|$, which is $|f_2+f_3+f_4|$ in the form shown in FIG. 1 exceeds the upper limit $0.75f$ of the condition 1, the diameter of the front lens element $L_1$ becomes enlarged whereby the conventional filter could not be applied thereto.

In addition, the desired great back-focal length could not be obtained, and as a result, it is required to make the air space between the front and rear lens groups long and hence the object of the invention of making the size of the lens system small could not be attained. If $|f_2+f_3+f_4|$ becomes smaller than the lower limit $0.45f$ of the condition 1, the negative refractive power of the front lens group becomes excessively great. As a result, the spherical aberration and coma out of axis become so much increased that these aberrations could not be corrected by the rear lens group III, IV, V, VI.

The condition 2 serves to correct the aberrations out of axis and insures a greater back-focal length. If $d_9+d_{10}$ becomes smaller than the lower limit $0.3f$, the coma out of axis becomes degraded and the great back-focal length could not be obtained. If $d_9+d_{10}$ exceeds the upper limit $0.8f$, the overall length of the system becomes larger and the diameter of the front lens element $L_1$ becomes enlarged, and as a result, the lens system could not be reduced in size and the astigmatism is so much increased that it becomes difficult to correct such increased astigmatism by means of any other components.

The condition 3 serves to give a strong positive refractive power to the cemented surface $R_{13}$ of the fourth component IV so as to correct the sagittal coma and the spherical aberration which have been produced owing to the large aperture ratio. If $|R_{13}|$ becomes smaller than the lower limit $0.33f$, higher degree of spherical aberration is produced to degrade the optimum performance of the system. If $|R_{13}|$ exceeds the upper limit $0.85f$, the refractive power at the cemented surface $R_{13}$ is decreased, and as a result, the sagittal coma and the spherical aberration could not be maintained in favorable condition.

The condition 4 serves to correct the spherical aberration and the astigmatism. The condition 4 for defining the axial thickness $d_{12}+d_{13}$ of the fourth component IV insures an excellent state of spherical aberration and the astigmatism. If $d_{12}+d_{13}$ becomes shorter than the lower limit $0.22f$, the correction of spherical aberration becomes insufficient. If $d_{12}+d_{13}$ exceeds the upper limit $0.7f$, the intermediate portion of the graph representing the astigmatism is considerably curved and hence the favorable flattening of the astigmatism could not be established.

In this kind of retrofocus type lens system, the aberrations of the system become degraded in case of taking photographs of objects located at a short distance from the lens system. In order to obviate such disadvantage, the fourth component IV may be moved in unison with the fifth component V in response to the distance between the objects to be taken photograph and the front lens element $L_1$. That is, the air spaces $d_{11}$ and $d_{16}$ may be changed such that $d_{11}+d_{16}$ is always kept constant. This makes it possible to prevent the aberrations of the system from being degraded, thereby maintaining excellent optical properties.

It is preferable to design the lens system shown in FIG. 1 such that it fulfills the following five conditions, i.e.

1. $0.45f < |\Sigma f_i| < 0.75f$
   $f_i < 0 \quad i = 2, 3, 4$
2. $0.3f < d_9+d_{10} < 0.8f$
3. $0.33f < |R_{13}| < 0.85f$
4. $0.22f < d_{12}+d_{13} < 0.7f$
5. $0.15f < d_6+d_8 < 0.35f$ The last condition 5 serves to minimize the overall length of the lens system and also prevent the diameter of the front lens element $L_1$ from being enlarged. If $d_6+d_8$ exceeds the upper limit $0.35f$ of the condition 5, it is impossible to minimize the lens system as is desired. On the contrary, if $d_6+d_8$ becomes shorter than the lower limit $0.15f$, the various aberrations become so much degraded that the correction of these various aberrations could not be effected by the other lens elements.

Figure 2:
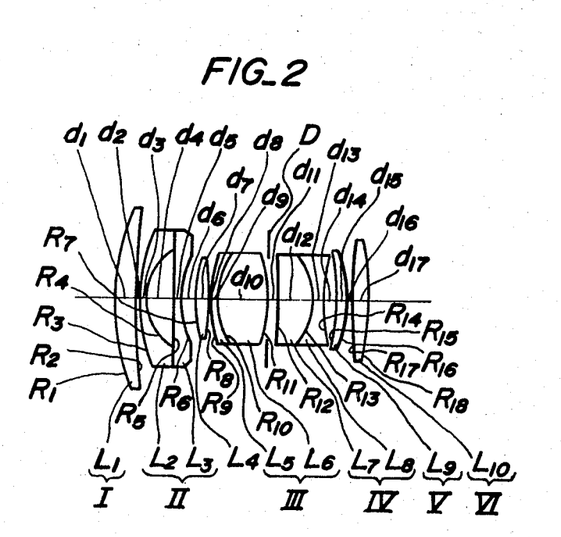
FIG. 2 is a diagrammatic view of another preferred form of the invention.

In FIG. 2 is shown another preferred form of the lens system according to the invention, which comprises six components I to VI and 10 lens elements $L_1$ to $L_{10}$. The first, third, fourth, fifth and sixth components I, III, IV, V and VI of the lens system shown in FIG. 2 are the same in form as those shown in FIG. 1.

But, the second component II of the lens system shown in FIG. 2 consists of two negative meniscus lens elements $L_2$ and $L_3$. Between the second and third components II and III is disposed the fourth lens element $L_4$ which is a positive biconvex lens having a relatively large axial thickness $d_7$ and adapted to correct the aberrations out of axis.

It is preferable to design the lens system shown in FIG. 2 such that it fulfills the following five conditions, i.e.

1. $0.45f < |\Sigma f_i| < 0.75f$
   $f_i < 0 \quad i = 2, 3$
2. $0.3f < d_9+d_{10} < 0.8f$
3. $0.33f < |R_{13}| < 0.85f$
4. $0.22f < d_{12}+d_{13} < 0.7f$
5. $0.16f < d_7/(d_9+d_{10}) < 0.3f$ The last condition 5 relates to the correction of astigmatism. The thinner the axial thickness $d_7$ of the added biconvex lens element $L_4$ the more effective is the correction of astigmatism and more particularly the more effective is the correction for the curvature of the intermediate portion of the graph representing the astigmatism. But, the spherical aberration becomes degraded. In order to prevent such degradation of the spherical aberration, $d_7/d_9+d_{10}$ should be greater than the lower limit $0.16f$. The upper limit $0.3f$ of the condition 5 serves to prevent the overall length of the lens system from becoming larger.

In the lens system shown in FIG. 2, it is preferable to define the sum of the air space $d_4$ between the second lens element $L_2$ and the third lens element $L_3$ and the air space $d_6$ between the third lens element $L_3$ and the fourth lens element $L_4$ by $0.35f < d_4+d_6 < 0.45f$ in order to reduce the overall length of the system and and also prevent the diameter of the front lens $L_1$ from being enlarged while retaining the high degree of correction in various aberrations over the entire system aperture ratio and over the entire picture angle.

In addition, it is preferable to make the refractive power of the cemented surface $R_{10}$ of the third component III relatively strong and negative and the concavity of the cemented surface $R_{10}$ is turned toward the diaphragm side in order to correct the coma. But, if the negative refractive power of the $R_{10}$ surface becomes excessively strong, the magnification chromatic aberration becomes degraded at a larger picture angle so that it is preferable to define the refractive indexes $n_5$ and $n_6$ of the fifth and sixth lens elements $L_5$ and $L_6$ and the radius of curvature $R_{10}$ of the cemented surface of the third component III are defined by $n_5 - n_6 > 0.18$
$0.6f < R_{10} < 0.7f$.

The lens systems shown in FIGS. 1 and 2 and fulfilling the above mentioned four conditions, 1 to 4, and more particularly five conditions, 1 to 5, and in addition sufficiently correcting the lens surfaces and the axial thicknesses of and the air space between the successive lens elements and made of glass material having suitable refractive index and Abbe mumber have the following numerical values as listed in the folloiwng Examples 1 to 4.

Example 1

| | | | $f = 100$ | | F/2.0 | | Picture angle 84° | |
|---|---|---|---|---|---|---|---|---|
| I-{ | $L_1$-{ | $R_1$ | 171.815 | $d_1$ | 20.41 | $n_1$ 1.757 | $v_1$ 47.9 |
| | | $R_2$ | 529.953 | $d_2$ | 0.82 | | |
| II-{ | $L_2$-{ | $R_3$ | 206.162 | $d_3$ | 7.35 | $n_2$ 1.62 | $v_2$ 60.3 |
| | | $R_4$ | 73.791 | $d_4$ | 8.16 | | |
| | $L_3$-{ | $R_5$ | 119.366 | $d_5$ | 6.12 | $n_3$ 1.62 | $v_3$ 60.3 |
| | | $R_6$ | 54.314 | $d_6$ | 11.84 | | |
| | $L_4$-{ | $R_7$ | 91.723 | $d_7$ | 6.12 | $n_4$ 1.67 | $v_4$ 57.3 |
| | | $R_8$ | 60.836 | $d_8$ | 14.29 | | |
| III-{ | $L_5$-{ | $R_9$ | 96.534 | $d_9$ | 6.12 | $n_5$ 1.773 | $v_5$ 49.6 |
| | $L_6$-{ | $R_{10}$ | 56.518 | $d_{10}$ | 46.94 | $n_6$ 1.596 | $v_6$ 39.2 |
| | | $R_{11}$ | −237.280 | $d_{11}$ | 9.8 | | |
| IV-{ | $L_7$-{ | $R_{12}$ | −442.731 | $d_{12}$ | 42.86 | $n_7$ 1.773 | $v_7$ 49.6 |
| | $L_8$-{ | $R_{13}$ | −51.983 | $d_{13}$ | 6.53 | $n_8$ 1.689 | $v_8$ 31.1 |
| | | $R_{14}$ | 229.59 | $d_{14}$ | 9.18 | | |
| V-{ | $L_9$-{ | $R_{15}$ | −283.402 | $d_{15}$ | 11.22 | $n_9$ 1.697 | $v_9$ 55.6 |
| | | $R_{16}$ | −88.571 | $d_{16}$ | 0.82 | | |
| VI-{ | $L_{10}$-{ | $R_{17}$ | 374.903 | $d_{17}$ | 15.51 | $n_{10}$ 1.697 | $v_{10}$ 55.6 |
| | | $R_{18}$ | −229.223 | | | | |
| | | $f_2+f_3+f_4 = -63.21$ | | | | | |

Figures 3A, 3B, 3C:
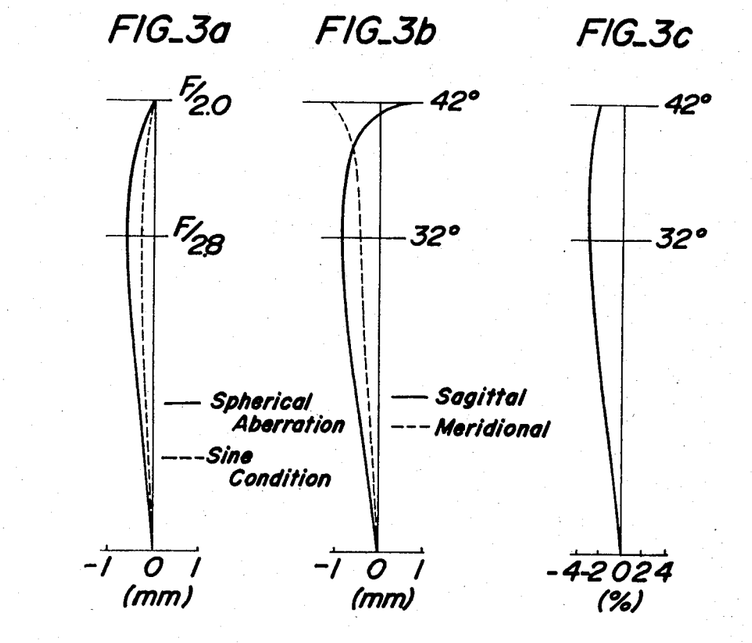
FIGS. 3a to 3h are graphical representations of the various aberrations related to the form of lens system shown in FIG. 1 and having the constructional data given in Example 1.
Figure 3D:
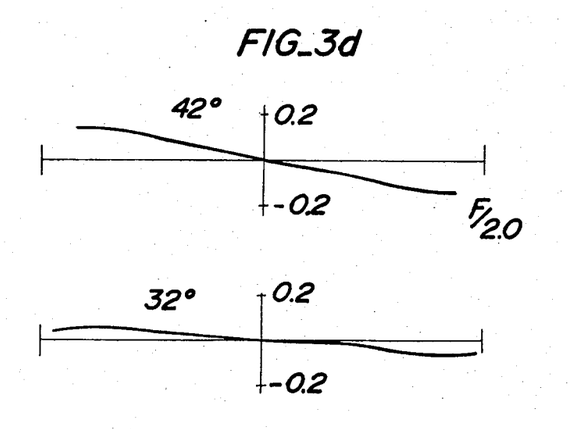
Figure 3E:
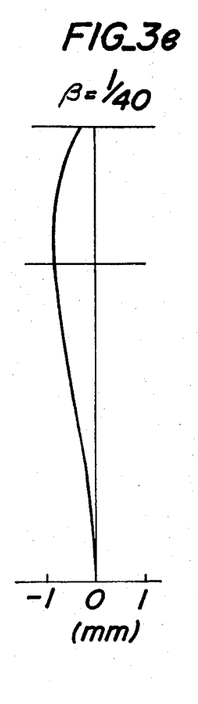
Figure 3F:
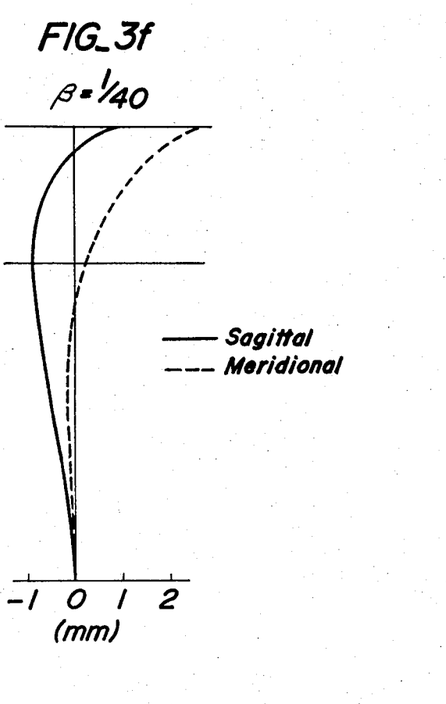
Figure 3G:
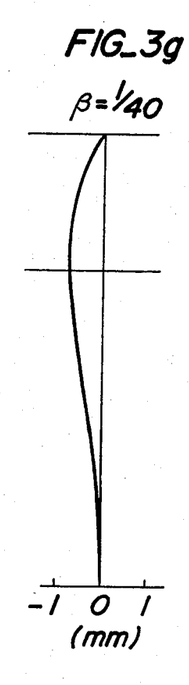
Figure 3H:
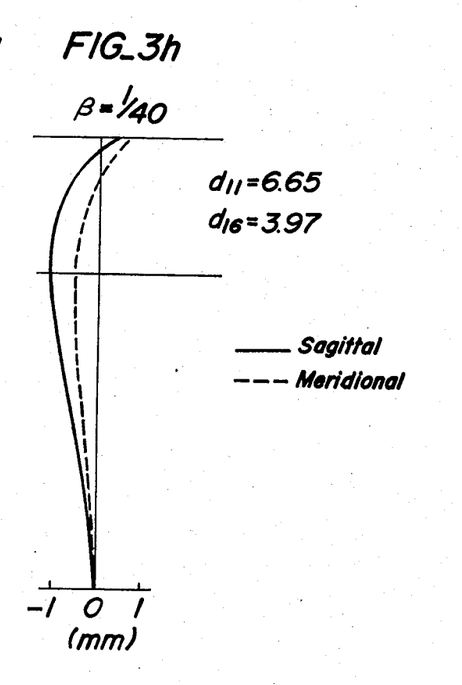

In FIGS. 3a to 3h are graphically represented the various aberrations related to the form of lens system shown in FIG. 1 and having the constructional data given in the Example 1. FIG. 3a represents the spherical aberration by a full line and the sine condition by dotted lines. FIG. 3b represents the sagittal astigmatism by a full line and the meridional astigmatism by dotted lines. FIG. 3c represents the distortion and FIG. 3d represents the comas at the half-picture angles of 42° and 32°, respectively. FIGS. 3e and 3f graphically represent the spherical aberration and the sagittal astigmatism (full line) and the meridional astigmatism (dotted line) when the air spaces $d_{11}$ and $d_{16}$ are not changed in case of taking photographs of objects located at a short distance from the front lens element $L_1$ with a photographic magnification $\beta=1/40$, respectively. FIGS. 3g and 3h graphically represent the spherical aberration and the sagittal astigmatism (full line) and the meridional astigmatism (dotted line) when the air space $d_{11}$ is changed from 9.8 to 6.65 and the air space $d_{16}$ is changed from 0.82 to 3.97 in case of taking photographs under the same conditions as above described. As seen from FIGS. 3e to 3h, means of moving the fourth component IV in unison with the fifth component V is capable of preventing the aberrations from being degraded.

Example 2

| | | | f=100 | | | F/2.0 | | Picture angle 84° | |
|---|---|---|---|---|---|---|---|---|---|
| I-[ | $L_1$-[ | $R_1$ | 158.829 | $d_1$ | 20.42 | $n_1$ 1.735 | | $\nu_1$ 49.8 | |
| | | $R_2$ | 494.844 | $d_2$ | 0.83 | | | | |
| | $L_2$-[ | $R_3$ | 211.445 | $d_3$ | 6.67 | $n_2$ 1.62 | | $\nu_2$ 60.2 | |
| | | $R_4$ | 78.389 | $d_4$ | 7.08 | | | | |
| II-{ | $L_3$-[ | $R_5$ | 110.028 | $d_5$ | 6.25 | $n_3$ 1.62 | | $\nu_3$ 60.2 | |
| | | $R_6$ | 54.935 | $d_6$ | 13.33 | | | | |
| | $L_4$-[ | $R_7$ | 96.345 | $d_7$ | 6.25 | $n_4$ 1.713 | | $\nu_4$ 54.0 | |
| | | $R_8$ | 61.403 | $d_8$ | 13.13 | | | | |
| III-[ | $L_5$-[ | $R_9$ | 110.269 | $d_9$ | 4.17 | $n_5$ 1.773 | | $\nu_5$ 49.6 | |
| | $L_6$-[ | $R_{10}$ | 65.073 | $d_{10}$ | 47.92 | $n_6$ 1.603 | | $\nu_6$ 38.0 | |
| | | $R_{11}$ | −291.388 | $d_{11}$ | 8.33 | | | | |
| IV-[ | $L_7$-[ | $R_{12}$ | −461.690 | $d_{12}$ | 53.33 | $n_7$ 1.773 | | $\nu_7$ 49.6 | |
| | $L_8$-[ | $R_{13}$ | −55.155 | $d_{13}$ | 8.33 | $n_8$ 1.689 | | $\nu_8$ 31.1 | |
| | | $R_{14}$ | 253.084 | $d_{14}$ | 6.67 | | | | |
| V-[ | $L_9$-[ | $R_{15}$ | −348.568 | $d_{15}$ | 14.17 | $n_9$ 1.697 | | $\nu_9$ 55.6 | |
| | | $R_{16}$ | −99.139 | $d_{16}$ | 0.83 | | | | |
| VI-[ | $L_{10}$-[ | $R_{17}$ | 498.412 | $d_{17}$ | 16.67 | $n_{10}$ 1.697 | | $\nu_{10}$ 55.6 | |
| | | $R_{18}$ | −175.249 | | | | | | |

$f_2+f_3+f_4 = -64.08$

Figures 4A, 4B, 4C:
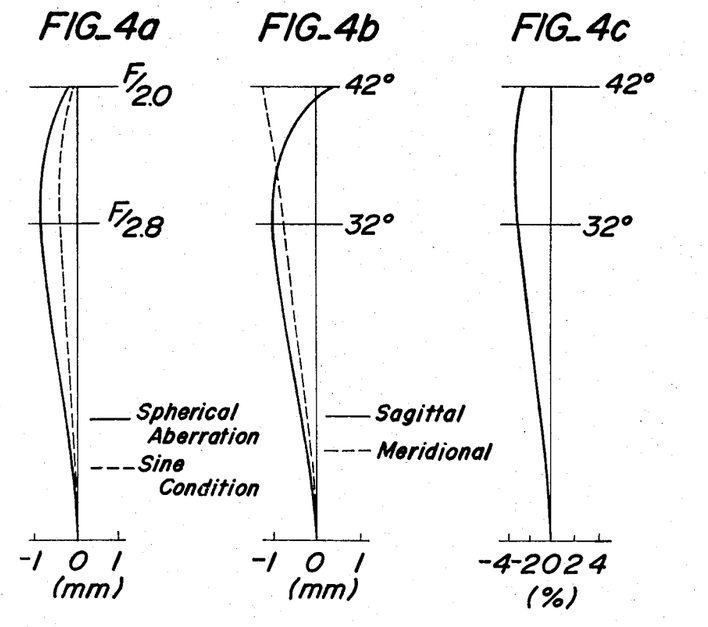
FIGS. 4a to 4d are graphical representations of the various aberrations related to the form of lens system shown in FIG. 1 and having the constructional data given in Example 2.
Figure 4D:
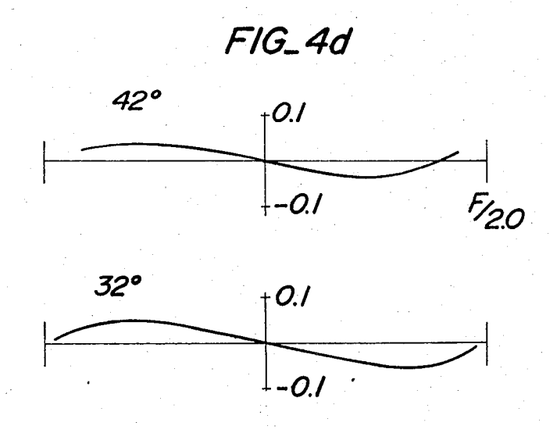

In FIGS. 4a to 4d are graphically represented the various aberrations related to the form of lens system shown in FIG. 1 and having the constructional data given in the Example 2. FIG. 4a represents the spherical aberration by a full line and the sine condition by dotted lines. FIG. 4b represents the sagittal astigmatism by a full line and the meridional astigmatism by dotted lines. FIG. 4c represents the distortion and FIG. 4d represents the comas at the half-picture angles of 42° and 32°, respectively.

As seen from FIGS. 3a to 3h and 4a to 4d, the lens systems in the form of the Examples 1 and 2 according to the invention are capable of significantly correcting the various aberrations for the aperture ratio on the order of F/2.0 and the picture angle up to 84°. In addition, these lens systems are short in their overall length and easy in handling and the diameter of the front lens $L_1$ is of 55 mm, thereby permitting the use of a conventional filter.

Example 3

| | | | f=100 | | | F/2.0 | | Picture angle 84° | |
|---|---|---|---|---|---|---|---|---|---|
| I-[ | $L_1$-[ | $R_1$ | 204.057 | $d_1$ | 18.27 | $n_1$ 1.744 | | $\nu_1$ 44.8 | |
| | | $R_2$ | 626.767 | $d_2$ | 0.82 | | | | |
| | $L_2$-[ | $R_3$ | 138.494 | $d_3$ | 7.35 | $n_2$ 1.603 | | $\nu_2$ 60.7 | |
| | | $R_4$ | 52.127 | $d_4$ | 26.12 | | | | |
| II-{ | $L_3$-[ | $R_5$ | ∞ | $d_5$ | 6.12 | $n_3$ 1.603 | | $\nu_3$ 60.7 | |
| | | $R_6$ | 67.098 | $d_6$ | 12.24 | | | | |
| | $L_4$-[ | $R_7$ | 233.682 | $d_7$ | 9.8 | $n_4$ 1.516 | | $\nu_4$ 56.8 | |
| | | $R_8$ | −633.159 | $d_8$ | 0.82 | | | | |
| III-[ | $L_5$-[ | $R_9$ | 111.159 | $d_9$ | 6.12 | $n_5$ 1.773 | | $\nu_5$ 49.6 | |
| | $L_6$-[ | $R_{10}$ | 64.249 | $d_{10}$ | 44.08 | $n_6$ 1.603 | | $\nu_6$ 38.0 | |
| | | $R_{11}$ | −316.204 | $d_{11}$ | 10.61 | | | | |
| IV-[ | $L_7$-[ | $R_{12}$ | −2,779.380 | $d_{12}$ | 32.24 | $n_7$ 1.773 | | $\nu_7$ 49.6 | |
| | $L_8$-[ | $R_{13}$ | −55.363 | $d_{13}$ | 8.16 | $n_8$ 1.699 | | $\nu_8$ 30.1 | |
| | | $R_{14}$ | 175.571 | $d_{14}$ | 12.25 | | | | |
| V-[ | $L_9$-[ | $R_{15}$ | −246.812 | $d_{15}$ | 12.25 | $n_9$ 1.697 | | $\nu_9$ 55.6 | |
| | | $R_{16}$ | −88.820 | $d_{16}$ | 0.82 | | | | |
| VI-[ | $L_{10}$-[ | $R_{17}$ | 339.233 | $d_{17}$ | 15.51 | $n_{10}$ 1.67 | | $\nu_{10}$ 57.3 | |
| | | $R_{18}$ | −239.616 | | | | | | |

$f_2+f_3 = -56.57$

The Seidel coefficients of the present embodiment represented by Berek are as follows:

| | A $v$ | $\Gamma v$ | B $v$ | $\Box v$ | P $v$ |
|---|---|---|---|---|---|
| 1 | 0.028 | 0.044 | 0.035 | 0.314 | 0.209 |
| 2 | 0.001 | 0.154 | −0.013 | −0.978 | −0.068 |
| 3 | 0.001 | 0.005 | 0.003 | 0.463 | 0.272 |
| 4 | −2.965 | −0.056 | 0.409 | 0.107 | −0.721 |
| 5 | 0.042 | 0.173 | 0.085 | 0.349 | 0.000 |
| 6 | −10.659 | 0.000 | −0.035 | −0.002 | −0.5607 |
| 7 | 3.747 | 0.168 | 0.795 | 0.067 | 0.145 |
| 8 | −0.391 | −0.261 | −0.319 | −0.170 | 0.054 |
| 9 | 5.653 | 0.183 | 1.017 | 0.103 | 0.392 |
| 10 | −2.395 | −0.006 | −0.121 | −0.005 | −0.092 |
| 11 | 0.002 | 0.009 | −0.004 | −0.308 | 0.119 |
| 12 | 0.001 | 0.063 | 0.009 | 0.341 | −0.016 |
| 13 | 1.828 | 0.001 | −0.042 | −0.001 | 0.044 |
| 14 | −1.684 | −0.683 | −1.073 | −0.584 | −0.234 |
| 15 | 0.001 | 0.144 | −0.009 | 0.333 | −0.166 |
| 16 | 4.081 | 0.018 | −0.272 | −0.032 | 0.462 |
| 17 | −0.004 | 0.034 | −0.011 | 0.255 | 0.118 |
| 18 | 3.355 | 0.044 | −0.385 | −0.024 | 0.167 |
| Σ | 0.643 | −0.034 | 0.068 | 0.230 | 0.124 |

Figures 5A, 5B, 5C:
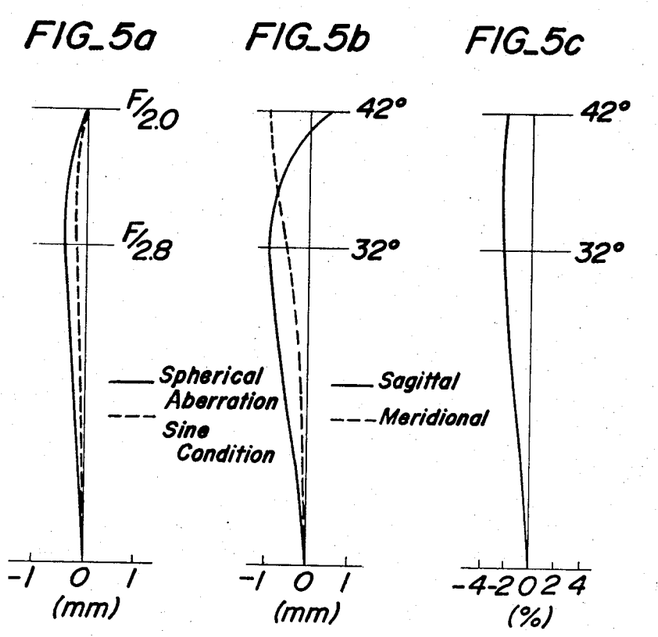
FIGS. 5a to 5e are graphical representations of the various aberrations related to the form of lens system shown in FIG. 2 and having the constructional data given in Example 3.
Figure 5D:
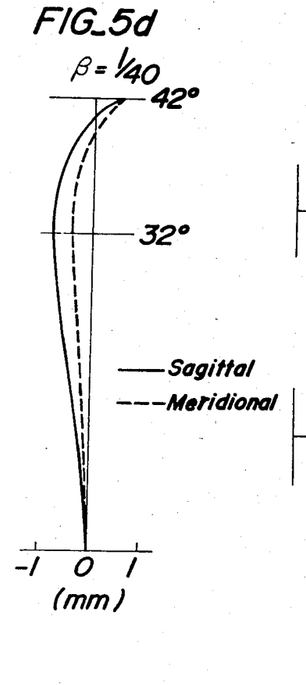
Figure 5E:
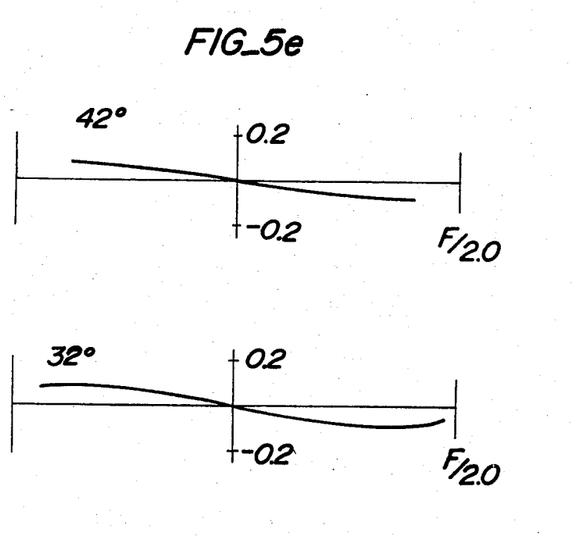

The lens system as constructed in the present Example 3 is shown in FIG. 2. The spherical aberration is graphically represented by a full line and the sine condition is graphically represented by dotted lines in FIG. 5a. The sagittal astigmatism is graphically represented by a full line and the meridional astigmatism is graphically represented by dotted lines in FIG. 5b. The distortion is graphically represented by FIG. 5c. FIG. 5d graphically represents the astigmatisms when the fourth and fifth components IV and V are moved in unison in case of taking photographs of objects located at a short distances from the lens system with a photographic magnification $\beta=1/40$. The sagittal astigmatism is graphically represented by a full line and the meridional astigmatism is graphically represented by dotted lines in FIG. 5d. FIG. 5e graphically represents the comas at the half picture angles 42° and 32°, respectively.

Figures 6A, 6B, 6C:
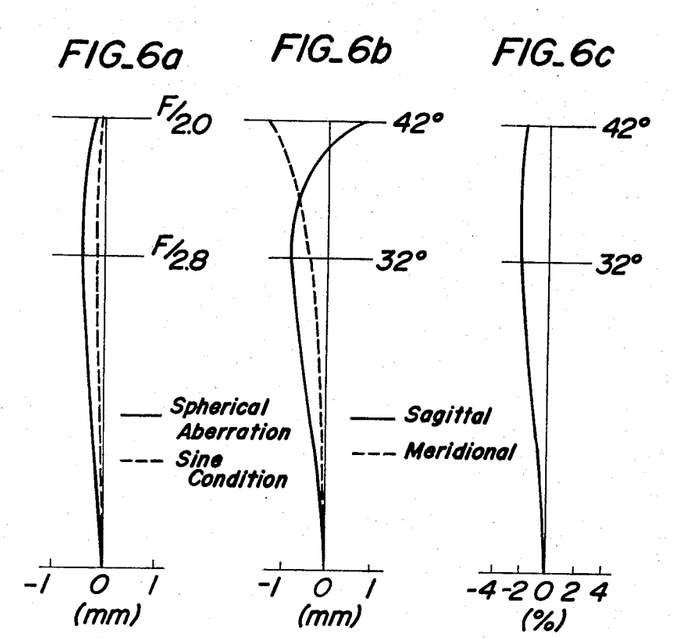
FIGS. 6a to 6e are graphical representations of the various aberrations related to the form of lens system shown in FIG. 2 and having the constructional data given in Example 4.
Figure 6D:
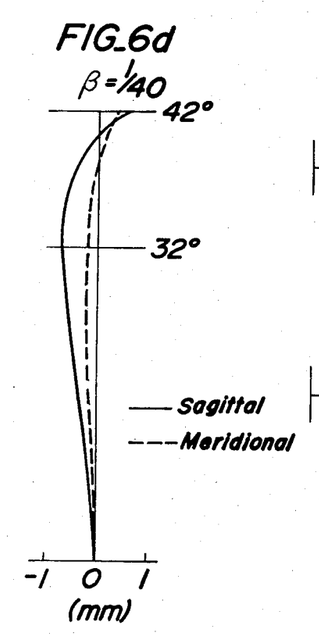
Figure 6E:
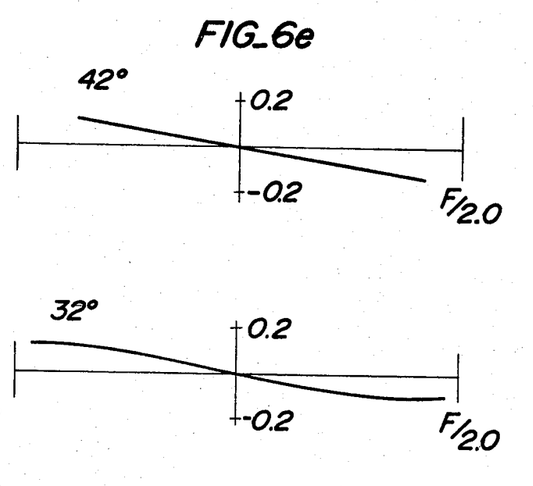

The spherical aberration related to the form of the lens system shown in Example 4 is graphically represented by a full line and the sine condition is graphically represented dotted lines in FIG. 6a. The sagittal astigmatism is graphically represented by a full line and the meridional astigmatism is graphically represented by dotted lines in FIG. 6b. The distortion is graphically represented by FIG. 6c. The astigmatism related to the form of the lens system shown in Example 4 when its fourth and fifth components IV and V are moved in unison with photographic magnification $\beta=1/40$ is graphically represented by FIG. 6d. The comas at half picture angles 42° and 32° are graphically represented by FIG. 6e, respectively.

As seen from FIGS. 5a to 5e and 6a to 6e, the lens systems in the form of the Examples 3 and 4 according to the invention are also capable of significantly correcting the various aberrations for the aperture ratio on the order of F/2.0 and the picture angle up to 84°. In addition, these lens systems are short in their overall length and easy in handling and the diameter of the front lens $L_1$ is of 55 mm, thereby permitting the use of a conventional filter.

What is claimed is:

1. A super-wide-angle lens system for photographic cameras, which comprises six components and 10 lens elements and in which the first component is a positive meniscus lens element, the second component includes two negative meniscus lens elements, the third component is a positive doublet lens element, the fourth component is a negative doublet lens element, the fifth component is a positive meniscus lens element and the sixth component is a positive lens element, and which fulfills the following four conditions, i.e.

1. $0.45f < |\Sigma f_i| < 0.75f$
   $f_i < 0$
2. $0.3f < d_9 + d_{10} < 0.8f$

Example 4

| | | | | f=100 | | F/2.0 | | Picture angle 84° | | |
|---|---|---|---|---|---|---|---|---|---|---|
| I-[ | $L_1$-[ | $R_1$ | 204.533 | | $d_1$ | 20.41 | $n_1$ 1.762 | | $v_1$ 40.2 | |
| | | $R_2$ | 588.8364 | | $d_2$ | 0.82 | | | | |
| | $L_2$-[ | $R_3$ | 142.018 | | $d_3$ | 7.35 | $n_2$ 1.603 | | $v_2$ 60.7 | |
| | | $R_4$ | 51.466 | | $d_4$ | 23.67 | | | | |
| II- | $L_3$-[ | $R_5$ | 1,137.947 | | $d_5$ | 6.12 | $n_3$ 1.603 | | $v_3$ 60.7 | |
| | | $R_6$ | 68.333 | | $d_6$ | 10.2 | | | | |
| | $L_4$-[ | $R_7$ | 237.882 | | $d_7$ | 14.29 | $n_4$ 1.518 | | $v_4$ 58.9 | |
| | | $R_8$ | −803.859 | | $d_8$ | 0.82 | | | | |
| III-[ | $L_5$-[ | $R_9$ | 112.074 | | $d_9$ | 6.12 | $n_5$ 1.773 | | $v_5$ 49.7 | |
| | $L_6$-[ | $R_{10}$ | 67.165 | | $d_{10}$ | 44.9 | $n_6$ 1.603 | | $v_6$ 38.0 | |
| | | $R_{11}$ | −273.857 | | $d_{11}$ | 10.2 | | | | |
| IV-[ | $L_7$-[ | $R_{12}$ | −581.727 | | $d_{12}$ | 32.65 | $n_7$ 1.773 | | $v_7$ 49.7 | |
| | $L_8$-[ | $R_{13}$ | −55.105 | | $d_{13}$ | 8.16 | $n_8$ 1.699 | | $v_8$ 30.1 | |
| | | $R_{14}$ | 193.177 | | $d_{14}$ | 11.43 | | | | |
| V-[ | $L_9$-[ | $R_{15}$ | −285.105 | | $d_{15}$ | 13.06 | $n_9$ 1.697 | | $v_9$ 55.6 | |
| | | $R_{16}$ | −92.058 | | $d_{16}$ | 0.82 | | | | |
| VI-[ | $L_{10}$-[ | $R_{17}$ | 361.523 | | $d_{17}$ | 15.51 | $n_{10}$ 1.697 | | $v_{10}$ 55.6 | |
| | | $R_{18}$ | −233.838 | | | | | | | |

3. $0.33f < |R_{13}| < 0.85f$
   $R_{13} < 0$
4. $0.22f < d_{12} + d_{13} < 0.7f$ wherein $f$ represents the overall focal length of the system, $\Sigma f_i$ represents the sum of focal lengths of the lens elements constituting the second component and $i=2, 3$ and $i=2, 3, 4$ numbering from the object side, $d_9, d_{10}, d_{12}$ and $d_{13}$ represent the axial thicknesses of the fifth, sixth, seventh and eighth lens elements constituting the third and fourth components, respectively, and $R_{13}$ represents the radius of curvature of the cemented surface of the fourth component.

2. A super-wide-angle lens system for photographic cameras as claimed in claim 1, wherein the fourth component IV is moved in unison with the fifth component V in response to the distance between the objects to be taken photograph and the front lens element $L_1$ such that the sum of the air space $d_{11}$ between the third and fourth components III and IV and the air space $d_{16}$ between the fifth and sixth lens elements $L_9$ and $L_{10}$ is always kept constant.

3. A super-wide-angle lens system for photographic cameras as claimed in claim 1, wherein said second component includes a third negative meniscus lens element.

4. A super-wide-angle lens system for photographic cameras, which comprises six components and 10 lens elements and in which the first component is a positive meniscus lens element, the second component consists of three negative meniscus lens elements, the third component is a positive doublet lens element, the fourth component is a negative doublet lens element, the fifth component is a positive meniscus lens element and the sixth component is a positive lens element, and which fulfills the following five conditions, i.e.

1. $0.45f < |\Sigma f_i| < 0.75f$
   $f_i < 0$
2. $0.3f < d_9 + d_{10} < 0.8f$
3. $0.33f < |R_{13}| < 0.85f$
   $R_{13} < 0$
4. $0.22f < d_{12} + d_{13} < 0.7f$
5. $0.15f < d_6 + d_8 < 0.35f$ wherein $f$ represents the overall focal length of the system, $\Sigma f_i$ represents the sum of focal lengths of the lens elements constituting the second component and $i=2, 3, 4$ numbering from the object side, $d_6$ and $d_8$ represent the air space between the third and fourth lens elements and the air space between the fourth and fifth lens elements, respectively, $d_9, d_{10}, d_{12}$ and $d_{13}$ represent the axial thicknesses of the fifth, sixth, seventh and eighth lens elements constituting the third and fourth components, respectively, and $R_{13}$ represents the radius of curvature of the cemented surface of the fourth component.

5. A super-wide-angle lens system for photographic cameras as claimed in claim 4, wherein the overall focal length $f=100$ mm, aperture ratio F/2.0, picture angle 84° and the radii of curvature $R_1$ to $R_{18}$, the axial thicknesses and air spaces $d_1$ to $d_{17}$, the refractive indexes $n_1$ to $n_{10}$ and the Abbe numbers $\nu_1$ to $\nu_{10}$ of the lens elements $L_1$ to $L_{10}$ numbered from the front to the rear of the system are defined by the following values:

| | | | | | | | | |
|---|---|---|---|---|---|---|---|---|
| I- | $L_1$- | $R_1$ | 171.815 | $d_1$ | 20.41 | $n_1$ 1.757 | $\nu_1$ 47.9 |
| | | $R_2$ | 529.963 | $d_2$ | 0.82 | | |
| | $L_2$- | $R_3$ | 206.162 | $d_3$ | 7.35 | $n_2$ 1.62 | $\nu_2$ 60.3 |
| | | $R_4$ | 73.791 | $d_4$ | 8.16 | | |
| II- | $L_3$- | $R_5$ | 119.366 | $d_5$ | 6.12 | $n_3$ 1.62 | $\nu_3$ 60.3 |
| | | $R_6$ | 54.314 | $d_6$ | 11.84 | | |
| | $L_4$- | $R_7$ | 91.723 | $d_7$ | 6.12 | $n_4$ 1.67 | $\nu_4$ 57.3 |
| | | $R_8$ | 60.836 | $d_8$ | 14.29 | | |
| III- | $L_5$- | $R_9$ | 96.534 | $d_9$ | 6.12 | $n_5$ 1.773 | $\nu_5$ 49.6 |
| | $L_6$- | $R_{10}$ | 56.518 | $d_{10}$ | 46.94 | $n_6$ 1.596 | $\nu_6$ 39.2 |
| | | $R_{11}$ | −237.280 | $d_{11}$ | 9.8 | | |
| IV- | $L_7$- | $R_{12}$ | −442.731 | $d_{12}$ | 42.86 | $n_7$ 1.773 | $\nu_7$ 49.6 |
| | $L_8$- | $R_{13}$ | −51.983 | $d_{13}$ | 6.53 | $n_8$ 1.689 | $\nu_8$ 31.1 |
| | | $R_{14}$ | 229.59 | $d_{14}$ | 9.18 | | |
| V- | $L_9$- | $R_{15}$ | −283.402 | $d_{15}$ | 11.22 | $n_9$ 1.697 | $\nu_9$ 55.6 |
| | | $R_{16}$ | −88.571 | $d_{16}$ | 0.82 | | |
| VI- | $L_{10}$- | $R_{17}$ | 374.903 | $d_{17}$ | 15.51 | $n_{10}$ 1.697 | $\nu_{10}$ 55.6 |
| | | $R_{18}$ | −229.223 | | | | |

6. A super-wide-angle lens system for photographic cameras as claimed in claim 4, wherein the overall focal length $f=100$ mm, aperture ratio F/2.0, picture angle 84° and the radii of curvature $R_1$ to $R_{18}$, the axial thicknesses and air spaces $d_1$ to $d_{17}$, the refractive indexes $n_1$ to $n_{10}$ and the Abbe numbers $\nu_1$ to $\nu_{10}$ of the lens elements $L_1$ to $L_{10}$ numbered from the front to the rear of the system are defined by the following values:

|   |   |   |   |   |   |   |   |
|---|---|---|---|---|---|---|---|
| I-{ | $L_1$-{ | $R_1$ | 158.829 | $d_1$ | 20.42 | $n_1$ 1.735 | $\nu_1$ 49.8 |
|   |   | $R_2$ | 494.844 | $d_2$ | 0.83 |   |   |
|   | $L_2$-{ | $R_3$ | 211.445 | $d_3$ | 6.67 | $n_2$ 1.62 | $\nu_2$ 60.2 |
|   |   | $R_4$ | 78.389 | $d_4$ | 7.08 |   |   |
| II-{ | $L_3$-{ | $R_5$ | 110.028 | $d_5$ | 6.25 | $n_3$ 1.62 | $\nu_3$ 60.2 |
|   |   | $R_6$ | 54.935 | $d_6$ | 13.33 |   |   |
|   | $L_4$-{ | $R_7$ | 96.345 | $d_7$ | 6.25 | $n_4$ 1.713 | $\nu_4$ 54.0 |
|   |   | $R_8$ | 61.403 | $d_8$ | 13.13 |   |   |
| III-{ | $L_5$-{ | $R_9$ | 110.269 | $d_9$ | 4.17 | $n_5$ 1.773 | $\nu_5$ 49.6 |
|   | $L_6$-{ | $R_{10}$ | 65.073 | $d_{10}$ | 47.92 | $n_6$ 1.603 | $\nu_6$ 38.0 |
|   |   | $R_{11}$ | −291.388 | $d_{11}$ | 8.33 |   |   |
| IV-{ | $L_7$-{ | $R_{12}$ | −461.690 | $d_{12}$ | 53.33 | $n_7$ 1.773 | $\nu_7$ 49.6 |
|   | $L_8$-{ | $R_{13}$ | −55.155 | $d_{13}$ | 8.33 | $n_8$ 1.689 | $\nu_8$ 31.1 |
|   |   | $R_{14}$ | 253.084 | $d_{14}$ | 6.67 |   |   |
| V-{ | $L_9$-{ | $R_{15}$ | −348.568 | $d_{15}$ | 14.17 | $n_9$ 1.697 | $\nu_9$ 55.6 |
|   |   | $R_{16}$ | −99.139 | $d_{16}$ | 0.83 |   |   |
| VI-{ | $L_{10}$-{ | $R_{17}$ | 498.412 | $d_{17}$ | 16.67 | $n_{10}$ 1.697 | $\nu_{10}$ 55.6 |
|   |   | $R_{18}$ | −175.249 |   |   |   |   |

7. A super-wide-angle lens system for photographic cameras, which comprises six components and 10 lens elements and in which the first component is a positive meniscus lens element, the second component consists of two negative meniscus lens elements and is followed by a positive lens element, the third component is a positive doublet lens element, the fourth component is a negative doublet lens element, the fifth component is a positive meniscus lens element and the sixth component is a positive lens element, and which fulfills the following five conditions, i.e.

1. $0.45f < |\Sigma f_i| < 0.75f$
   $f_i < 0$
2. $0.3f < d_9+d_{10} < 0.8f$
3. $0.33f < |R_{13}| < 0.85f$
   $R_{13} < 0$
4. $0.22f < d_{12}+d_{13} < 0.7f$
5. $0.16f < [d_7/(d_9+d_{10})] < 0.3f$ wherein $f$ represents the overall focal length of the system, $\Sigma f_i$ represents the sum of focal lengths of the lens elements constituting the second component and $i=2$, 3 numbering from the object side, $d_7$, $d_9$, $d_{10}$, $d_{12}$ and $d_{13}$ represent the axial thicknesses of the fourth, fifth, sixth, seventh and eighth lens elements, respectively, the fifth, sixth, seventh and eighth lens elements being constituting the third and fourth components, respectively, and $R_{13}$ represents the radius of curvature of the cemented surface of the fourth component.

8. A super-wide-angle lens system for photographic cameras as claimed in claim 7, wherein the sum of the air space $d_4$ between the second lens element and the third lens element and the air space $d_6$ between the third lens element $L_3$ and the fourth lens element $L_4$ is defined by
$0.35f < d_4+d_6 < 0.45f$.

9. A super-wide-angle lens system for photographic cameras as claimed in claim 7, wherein the refractive indexes $n_5$ and $n_6$ of the fifth and sixth lens elements $L_5$ and $L_6$ and the radius of curvature $R_{10}$ of the cemented surface of the third component III are defined by
$n_5-n_6 > 0.18$
$0.6f < R_{10} < 0.7f$.

10. A super-wide-angle lens system for photographic cameras as claimed in claim 7, wherein the overall focal length $f=100$ mm, aperture ratio F/2.0, picture angle 84° and the radii of curvature $R_1$ to $R_{18}$, the axial thickness and air spaces $d_1$ to $d_{17}$, the refractive indexes $n_1$ to $n_{10}$ and the Abbe numbers $\nu_1$ to $\nu_{10}$ of the lens elements $L_1$ to $L_{10}$ numbered from the front to the rear of the system are defined by the following values:

|   |   |   |   |   |   |   |   |
|---|---|---|---|---|---|---|---|
| I-{ | $L_1$-{ | $R_1$ | 204.057 | $d_1$ | 18.27 | $n_1$ 1.744 | $\nu_1$ 44.8 |
|   |   | $R_2$ | 626.767 | $d_2$ | 0.82 |   |   |
|   | $L_2$-{ | $R_3$ | 138.494 | $d_3$ | 7.35 | $n_2$ 1.603 | $\nu_2$ 60.7 |
|   |   | $R_4$ | 52.127 | $d_4$ | 26.12 |   |   |
| II-{ | $L_3$-{ | $R_5$ | ∞ | $d_5$ | 6.12 | $n_3$ 1.603 | $\nu_3$ 60.7 |
|   |   | $R_6$ | 67.098 | $d_6$ | 12.24 |   |   |
|   | $L_4$-{ | $R_7$ | 233.682 | $d_7$ | 9.8 | $n_4$ 1.516 | $\nu_4$ 56.8 |
|   |   | $R_8$ | −633.159 | $d_8$ | 0.82 |   |   |
|   |   | $R_9$ | 111.159 |   |   |   |   |

| | | | | | | | | |
|---|---|---|---|---|---|---|---|---|
| III-[ | $L_5$-[ | | | $d_9$ | 6.12 | $n_5$ 1.773 | $v_5$ 49.6 |
| | $L_6$-[ | $R_{10}$ | 64.249 | $d_{10}$ | 44.08 | $n_6$ 1.603 | $v_6$ 38.0 |
| | | $R_{11}$ | −316.204 | $d_{11}$ | 10.61 | | |
| | | $R_{12}$ | −2,779.380 | $d_{12}$ | 32.24 | $n_7$ 1.773 | $v_7$ 49.6 |
| IV-[ | $L_7$-[ | $R_{13}$ | −55.363 | $d_{13}$ | 8.16 | $n_8$ 1.699 | $v_8$ 30.1 |
| | $L_8$-[ | $R_{14}$ | 175.571 | $d_{14}$ | 12.25 | | |
| V-[ | $L_9$-[ | $R_{15}$ | −246.812 | $d_{15}$ | 12.25 | $n_9$ 1.697 | $v_9$ 55.6 |
| | | $R_{16}$ | −88.820 | $d_{16}$ | 0.82 | | |
| VI-[ | $L_{10}$-[ | $R_{17}$ | 339.233 | $d_{17}$ | 15.51 | $n_{10}$ 1.67 | $v_{10}$ 57.3 |
| | | $R_{18}$ | −239.616 | | | | |

11. A super-wide-angle lens system for photographic cameras as claimed in claim 7, wherein the overall focal length $f$=100 mm, aperture ratio F/2.0, picture angle 84° and the radii of curvature $R_1$ to $R_{18}$, the axial thicknesses and air spaces $d_1$ to $d_{17}$, the refractive indexes $n_1$ to $n_{10}$ and the Abbe numbers $v_1$ to $v_{10}$ of the lens elements $L_1$ to $L_{10}$ numbered from the front to the rear of the system are defined by the following values:

| | | | | | | | | |
|---|---|---|---|---|---|---|---|---|
| I-[ | $L_1$-[ | $R_1$ | 204.533 | $d_1$ | 20.41 | $n_1$ 1.762 | $v_1$ 40.2 |
| | | $R_2$ | 588.8364 | $d_2$ | 0.82 | | |
| II- | $L_2$-[ | $R_3$ | 142.018 | $d_3$ | 7.35 | $n_2$ 1.603 | $v_2$ 60.7 |
| | | $R_4$ | 51.466 | $d_4$ | 23.67 | | |
| | $L_3$-[ | $R_5$ | 1,137.947 | $d_5$ | 6.12 | $n_3$ 1.603 | $v_3$ 60.7 |
| | | $R_6$ | 68.333 | $d_6$ | 10.2 | | |
| | $L_4$-[ | $R_7$ | 237.882 | $d_7$ | 14.29 | $n_4$ 1.518 | $v_4$ 58.9 |
| | | $R_8$ | −802.859 | $d_8$ | 0.82 | | |
| III-[ | $L_5$-[ | $R_9$ | 112.074 | $d_9$ | 6.12 | $n_5$ 1.773 | $v_5$ 49.7 |
| | $L_6$-[ | $R_{10}$ | 67.165 | $d_{10}$ | 44.9 | $n_6$ 1.603 | $v_6$ 38.0 |
| | | $R_{11}$ | −273.857 | $d_{11}$ | 10.2 | | |
| | | $R_{12}$ | −581.727 | $d_{12}$ | 32.65 | $n_7$ 1.773 | $v_7$ 49.7 |
| IV-[ | $L_7$-[ | $R_{13}$ | −55.105 | $d_{13}$ | 8.16 | $n_8$ 1.699 | $v_8$ 30.1 |
| | $L_8$-[ | $R_{14}$ | 193.177 | $d_{14}$ | 11.43 | | |
| V-[ | $L_9$-[ | $R_{15}$ | −285.105 | $d_{15}$ | 13.06 | $n_9$ 1.697 | $v_9$ 55.6 |
| | | $R_{16}$ | −92.058 | $d_{16}$ | 0.82 | | |
| VI-[ | $L_{10}$-[ | $R_{17}$ | 361.523 | $d_{17}$ | 15.51 | $n_{10}$ 1.697 | $v_{10}$ 55.6 |
| | | $R_{18}$ | −233.838 | | | | |

* * * * *